United States Patent
Sing

(10) Patent No.: US 8,464,383 B2
(45) Date of Patent: Jun. 18, 2013

(54) FABRIC-EARING OUTSOLES, SHOES BEARING SUCH OUTSOLES AND RELATED METHODS

(75) Inventor: Tsoi Wing Sing, North Point (HK)

(73) Assignee: Calson Investment Limited, North Point (HK)

(*) Notice: Subject to any disclaimer, the term of this patent is extended or adjusted under 35 U.S.C. 154(b) by 665 days.

(21) Appl. No.: 12/689,750

(22) Filed: Jan. 19, 2010

(65) Prior Publication Data

US 2011/0173839 A1 Jul. 21, 2011

(51) Int. Cl.
*A43B 13/14* (2006.01)
*A43B 13/04* (2006.01)

(52) U.S. Cl.
USPC .............. 12/146 BR; 12/146 B; 36/59 R; 36/17 R; 156/307.3; 156/307.5; 156/242

(58) Field of Classification Search
USPC ............ 12/146 BR, 146 B; 36/59 R, 17 R, 36/30 R, 59 C, 25 R; 156/307.1, 307.3, 256, 156/307.5, 242, 245, 307
See application file for complete search history.

(56) References Cited

U.S. PATENT DOCUMENTS

| | | | |
|---|---|---|---|
| 384,483 A | 6/1888 | Walters | |
| 1,587,377 A | 6/1926 | Grosjean | |
| 1,716,790 A | 6/1929 | Mitchell | |
| 1,811,803 A | 6/1931 | Oakley | |
| 2,121,678 A * | 6/1938 | Armor | 36/30 R |
| 2,275,720 A | 3/1942 | Bingham, Jr. | |
| 2,371,689 A | 3/1945 | Gregg et al. | |
| 2,499,751 A | 3/1950 | Hoza | |
| 2,663,097 A | 12/1953 | Giese, Jr. | |
| 2,844,833 A | 7/1958 | Odermatt | |
| 3,016,631 A | 1/1962 | Servin | |
| 3,813,719 A | 6/1974 | Kaschura | |
| 4,122,574 A | 10/1978 | Karalis | |
| 4,356,643 A | 11/1982 | Kester et al. | |
| 5,505,011 A | 4/1996 | Bleimhofer | |
| 5,553,399 A | 9/1996 | Strong | |
| 5,653,046 A * | 8/1997 | Lawlor | 36/28 |
| 5,725,823 A | 3/1998 | Finn et al. | |
| 6,430,844 B1 | 8/2002 | Otis | |
| 6,571,491 B2 | 6/2003 | Safdeye et al. | |
| 6,696,000 B2 | 2/2004 | Otis et al. | |
| 6,698,109 B2 | 3/2004 | Otis et al. | |
| 6,823,611 B2 | 11/2004 | Otis et al. | |
| 6,944,975 B2 | 9/2005 | Safdeye et al. | |
| 7,036,246 B2 | 5/2006 | Otis et al. | |
| 7,048,881 B2 | 5/2006 | Otis et al. | |
| 7,179,414 B2 * | 2/2007 | Safdeye et al. | 264/244 |
| 7,353,626 B2 | 4/2008 | Otis et al. | |
| 7,373,739 B2 | 5/2008 | Doerer et al. | |
| 7,451,511 B2 | 11/2008 | Ellis et al. | |
| 2002/0178612 A1 * | 12/2002 | Tsen et al. | 36/14 |
| 2003/0009919 A1 | 1/2003 | Stein | |
| 2004/0006890 A1 | 1/2004 | Otis et al. | |
| 2004/0020080 A1 * | 2/2004 | Cox et al. | 36/103 |

* cited by examiner

*Primary Examiner* — Ted Kavanaugh
(74) *Attorney, Agent, or Firm* — Joseph M. Rolnicki; Evans & Dixon, LLC

(57) ABSTRACT

A method for making a shoe outsole comprises placing rubber against a coating of cured rubber cement on a segment of fabric, heating the rubber to a temperature below the melting points of the cured rubber cement and the rubber, but high enough to render the cured rubber cement and the rubber tackily adherent to each other and vulcanizing the rubber, thereby to adhere the segment of fabric to the rubber, and cooling the vulcanized rubber to form an outsole having an exposed ground-contacting surface that includes the segment of fabric.

20 Claims, 2 Drawing Sheets

US 8,464,383 B2

FABRIC-EARING OUTSOLES, SHOES BEARING SUCH OUTSOLES AND RELATED METHODS

BACKGROUND OF THE INVENTION

1. Field of the Invention

This invention relates to outsoles, shoes and methods of manufacture thereof, and more particularly to partially fabric outsoles, shoes bearing such outsoles and methods for manufacture of such outsoles and shoes.

2. Description of the Related Art

The outsole of the shoe is the exposed portion of the sole that contacts the ground or other supporting surface. In a shoe, generally the outsole is attached to a shoe "lower," which in turn is attached to the shoe "upper."

Shoes are generally classified based at least in part upon the materials of the upper and the outsole into various classes under Chapter 64 of the United States Harmonized Tariff Schedules. That classification then determines the rate of duty to be assessed on the shoes as they are imported into the United States. Thus, the material of the outsole can often determining the rate of duty which is to be applied to the specific shoe.

Depending on the material used to manufacture the upper and the outsole, the rate of the duty may vary significantly. For example, the rate of duty may range from 37.5% ad valorem for many common types of footwear to 3% ad valorem for certain types of sandals and similar footwear. Particularly advantageous rates of duty for rubber soled shoes can be obtained if 50% or more of the bottom surface of the shoe (outsole) that contacts the ground is fabric.

Therefore, a variety of techniques have been developed for partially coating or covering a shoe outsole with fabric or producing a shoe with such an outsole. Many of such techniques have been patented. For example, U.S. Pat. No. 7,451,511 describes a seven-step process for preparation of a partial fabric-bottom shoe sole. In its broadest conception, the process comprises: a) covering a sheet of fabric with TPU (thermoplastic urethane) by superimposing the fabric sheet with a sheet of TPU; b) heating the TPU sheet to its melting point to adhere it to the fabric sheet; c) cooling the TPU-covered fabric; d) cutting the cooled TPU-covered fabric to fit a backing member; e) positioning the cut, cooled TPU-covered fabric into the bottom of a mold; injecting TPR (thermoplastic rubber) into the mold at a temperature below the melting point of the TPU, but high enough to render the TPU tackily adherent to the TPR; and g) cooling the resultant outsole.

U.S. Pat. No. 6,571,491 describes a method of manufacturing a shoe outsole that comprises inserting a fabric material into a first mold, injecting a first material into the first mold and operating the first mold to form a reinforced fabric material, inserting the reinforced fabric material into a second mold, injecting a second material into the second mold and operating the second mold to form the outsole to produce an outsole that includes an exposed, ground contacting surface comprising a first section formed of the second material and free of fabric material, and a second section formed of the reinforced fabric material. The patent also describes a method of manufacturing a shoe by attaching a shoe lower to a shoe upper and attaching an outsole having a ground contacting surface to the shoe lower and produced by the method described in the patent for producing the outsole.

U.S. Pat. No. 6,430,844 describes a shoe such as a slipper with at least a partially fabric bottom, but provides little guidance as to how it is produced. The shoe described in the patent comprises an outsole that consists essentially of an inner backing part of a shape-retaining, moldable material, and an outer fabric part of a fabric material different from the shape-retaining material. According to the patent, the outer fabric part is retained and held in shape and position by the shape-retaining material of the inner backing part and the inner backing part is molded in a common mold in situ with, and integrally embedded in, the outer fabric part to resist separation of the different materials and to resist shape distortion of the outer fabric part. Further, a cushioning element overlies and is non-moldably attached to the outsole and an upper is non-moldably attached to the outsole.

U.S. Pat. No. 6,696,000 is a division of the application that issued as U.S. Pat. No. 6,430,844 and so its specification also contains little guidance for how to make the shoe of that patent, but nevertheless claims a method of making the shoe. According to the claims of U.S. Pat. No. 6,696,000, the method comprises the steps of a) molding a molded shoe outsole with an inner backing part of a shape-retaining, moldable material and with an outer fabric part of a fabric material different from the shape-retaining material, the molding step being performed by placing the outer fabric part in an injection mold, and by injection molding the inner backing part in situ with the outer fabric part in the injection mold; b) continuing the injection molding step until at least the inner backing part is integrally embedded in the outer fabric part in order to resist separation of the different materials and to resist shape distortion of the outer fabric part which is retained and held in shape and position by the shape-retaining material of the inner backing part; and c) attaching a shoe upper to the molded shoe outsole subsequently to, and independently of, the molding step.

U.S. Pat. No. 7,179,414 claims a method of manufacturing a shoe that comprises the steps of: a) inserting a sheet of fabric material into a first injection mold; b) injecting a curable, flowable, thermoplastic material into the first mold into contact with the sheet of fabric material for bonding therewith upon curing to form an integrated fabric-thermoplastic part; c) removing the integrated fabric-thermoplastic part from the first mold; d) inserting the integrated fabric-thermoplastic part into a second mold; e) injecting a curable, flowable thermoplastic material into the second mold into contact with the integrated fabric-thermoplastic part for bonding therewith upon curing to form an outsole; f) removing the outsole from the second mold; and g) independently non-moldably attaching a shoe upper to the outsole at a site at which molding is not performed.

Other patents show various partial fabric-bearing outsoles and methods for preparation of them as well. Each of the techniques, outsoles and shoes shown in the patents noted above and the other patents involve various disadvantages. For example, the industry is always searching for lower cost materials and manufacturing techniques, as well as lower energy consumption and more environmentally friendly methods for manufacturing partial fabric-bearing outsoles.

SUMMARY OF THE INVENTION

Briefly, therefore, the present invention is directed to a novel method for making a shoe outsole. The method comprises acquiring a segment of fabric bearing a coating of cured rubber cement, placing rubber against the coating of cured rubber cement, heating the rubber to a temperature below the melting points of the cured rubber cement and the rubber, but high enough to render the cured rubber cement and the rubber tackily adherent to each other and vulcanizing the rubber, thereby to adhere the segment of fabric to the rubber, and cooling the vulcanized rubber to form an outsole having an exposed ground-contacting surface that includes the segment of fabric.

The present invention is also directed to a novel method for making a shoe outsole, comprising: a) coating a sheet of fabric with rubber cement and allowing the rubber cement to cure to form a coated fabric sheet; b) cutting the coated fabric sheet to form a cut, coated fabric that fits a backing member; c) positioning the cut, coated fabric into the bottom of a mold; d) injecting rubber into the mold at a temperature below the melting points of the cured rubber cement and the rubber, but high enough to render the cured rubber cement and the rubber tackily adherent to each other to form a resultant outsole; and e) cooling the resultant outsole.

The present invention is further directed to a novel method for making a shoe, comprising forming a shoe outsole by either of the foregoing methods and attaching a shoe upper the outsole.

The present invention is still further directed to outsoles and shoes made by such methods.

BRIEF DESCRIPTION OF THE DRAWINGS

Corresponding reference numbers indicate corresponding parts throughout the several views of the drawings.

DETAILED DESCRIPTION OF THE PREFERRED EMBODIMENTS

Figure 1:
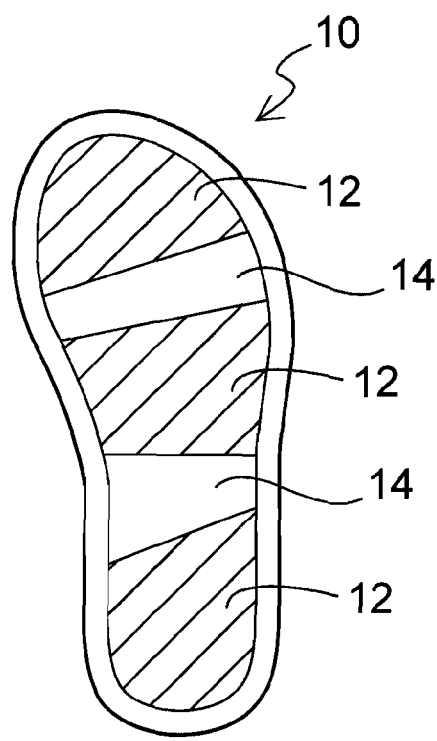
FIG. 1 is a plan view of an outsole of the present invention.

As shown in FIG. 1, a shoe outsole 10 has an exposed surface intended for ground contact when a shoe bearing the outsole is worn. At least a portion of the exposed surface, and preferably only a portion of the exposed surface, is fabric, the fabric portion being made up of at least one exposed segment of fabric 12. In a preferred embodiment, the remainder of the surface is some form of rubber, the segments of outsole 10 that are exposed rubber being designated in FIG. 1 as 14. As will be discussed in more detail below, the outsole 10 may be manufactured by positioning a segment of fabric coated with cured rubber cement into the bottom of a mold, injecting thermoplastic rubber into the mold at a temperature below the melting points of the cured rubber cement and the thermoplastic rubber, but high enough to render the cured rubber cement and the thermoplastic rubber tackily adherent to each other to form a resultant outsole, and cooling the resultant outsole, a fabric-bearing outsole. It has been found that this technique affords advantages over various prior art techniques. Thus, for example, covering the fabric with rubber cement provides environmental advantages over a method such as described in U.S. Pat. No. 7,451,511 wherein the fabric is coated with TPU and heated for adhesion therebetween by eliminating the need for energy to heat the TPU in the noted patented method, resulting in a method that can be less expensive and more environmentally friendly. In fact, it eliminates the use of TPU, which is difficult to degrade after the end of life of the product, and instead can use a natural rubber-based rubber cement.

Figure 2:
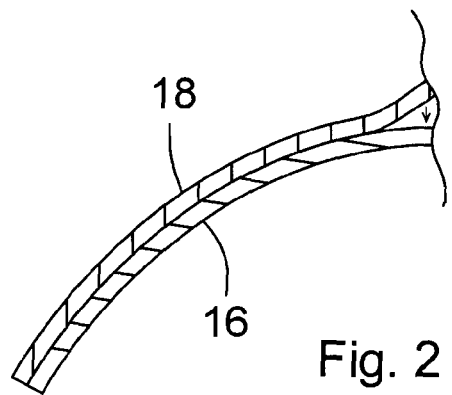
FIG. 2 is a partial elevation of fabric being coated with rubber cement.

Referring now to FIG. 2, a sheet of fabric 16 is coated with rubber cement 18 by any of the various known methods. For example, the rubber cement may be brushed on, spread on or poured on the sheet of fabric. The sheet may be a large cloth that may be cut to size, as discussed below, or a segment that is already sized and shaped prior to application of the rubber cement. While the rubber cement seeps into the fabric, it also leaves a coating on the side of the fabric to which it has been applied. Preferably, the coating is sufficient to provide a coating of thickness, upon curing, of about one to about two millimeters.

The rubber cement may be any type, although a preferred formulation is natural rubber and water. The fabric may be woven or unwoven and may be selected in view of the customs requirements to ensure favorable customs treatment. Other considerations in selection of the fabric include the low cost and ready availability of the fabric, resistance of the fabric to wear, and ease with which patterns or other designs may be printed on the fabric. Those of ordinary skill in the art will readily recognize suitable fabrics.

The rubber cement is then allowed to cure to form a coated fabric sheet. It may be allowed to cure by simple air-drying or curing may be aided or accelerated, such as by heat or blowing air or both.

Figure 3:
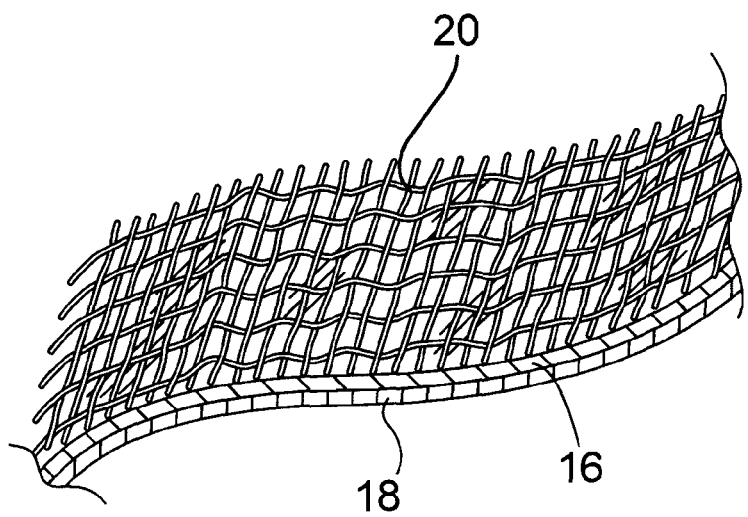
FIG. 3 is a partial perspective view of rubber cement-coated fabric coated with mesh.

Optionally, and in some instances preferably, an open mesh sheet 20 is at least temporarily adhered onto the side of the fabric 16 opposite the rubber cement coating 18, such that the fabric sheet 16 is sandwiched between the rubber cement coating 18 and the mesh 20. See FIG. 3. The mesh 20 may be formed of fabric threads in an open weave. Thus, the mesh 20 has the appearance of crossed fibers defining generally rectangular (preferably generally square) openings. The mesh 20 should be selected to qualify as a "fabric" for customs purposes. Preferably, the materials in the thread of the mesh 20 are ecologically friendly, especially natural fibers. And the considerations discussed above with respect to the fabric 16 are likewise considerations with respect to the mesh 20 as well. Further, in contrast to the fabric 16, the mesh 20 should meet or exceed the following specifications (based on 1 meter width): Yarn count=32S, Weight=18 pounds.

Any non-toxic adhesive sufficient to adhere the mesh to the fabric may be used, but it especially desired that the adhesive be a temporary adhesive sufficient only to adhere the mesh 20 to the fabric 16 only until the rubber of the rubber cement coating 18 is heated to pass through the fabric 16 and vulcanized by standard techniques that employ high temperature and chemicals used in vulcanization to prevent the mesh 20 from separating from the fabric 16 during the stresses resulting from use of the shoes that bear the fabric and mesh on the outsole. In particular, as those of ordinary skill in the art will readily appreciate, the vulcanization process employs pressure, high temperature and moisture in the form of steam, sulfur and other chemicals to unite the sulfur with the rubber to produce saturated double bonds, thereby to change the rubber into the required shape, to harden it and to increase its durability, as well as to adhere the fabric and mesh into. The rubber, therefore, has the characteristics of adhesion which are fully exerted only upon vulcanization.

Figure 4:
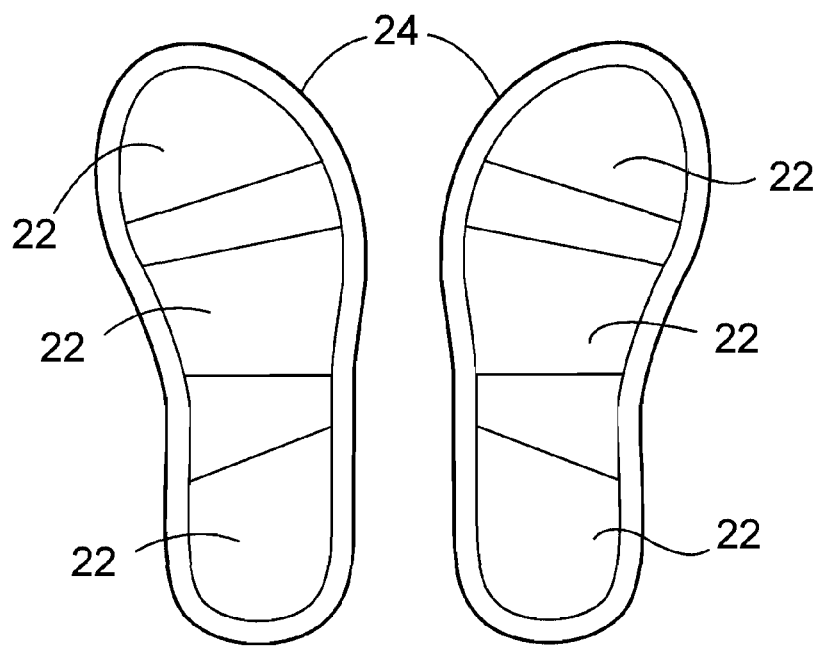
FIG. 4 is a plan view of a mold containing segments of cured rubber cement-coated fabric.

As illustrated in FIG. 4, the coated fabric sheet 22 is to be sized and shaped to fit the bottom of a mold 24. If the fabric 16 that has been coated with the rubber cement was already sized and shaped as desired before application of the rubber cement, once it has been coated with rubber cement, the rubber cement may be allowed to cure and the cured, coated fabric positioned into the bottom of a mold (rubber cement-coated side up—that is, the coated side is exposed and the fabric side lies against the bottom surface of the mold) or the coated fabric may be positioned into the bottom of the mold (rubber cement-coated side up) before the rubber cement cures and the rubber cement may be allowed to cure while the fabric is in position in the bottom of the mold. While the rubber cement may be applied after the fabric has been positioned in the bottom of a mold, that approach is inefficient and so less desirable. Not only does it take longer to carry out, but it requires more labor to apply cement on each piece of fabric. Moreover, it also incurs the risk of spilling rubber cement in the mold and curing might take longer as well.

If the coated fabric sheet is larger than desired for application to the outsole, it is then cut to form a cut, coated fabric that fits a backing member. The cut, coated fabric is then positioned into the bottom of a mold (rubber cement-coated side up).

As shown in FIG. 4, the fabric segment positioned in the bottom of the mold, whether the segment was already sized and shaped prior to application of the rubber cement or cut from the coated fabric, may be one of a plurality of such segments so produced and placed in the bottom of the mold. In a preferred embodiment, the total area of such segments makes up a percentage of the total area of the bottom of the mold, and so the total area of the outsole surface exposed for ground contact, sufficient to meet the customs specification for a rate of duty less than that were the fabric segments not included. Preferably, the total area of the fabric segments makes up more than 50%, and more preferably at least 51%, of the total area of the surface of the outsole exposed for ground contact.

Figure 5:
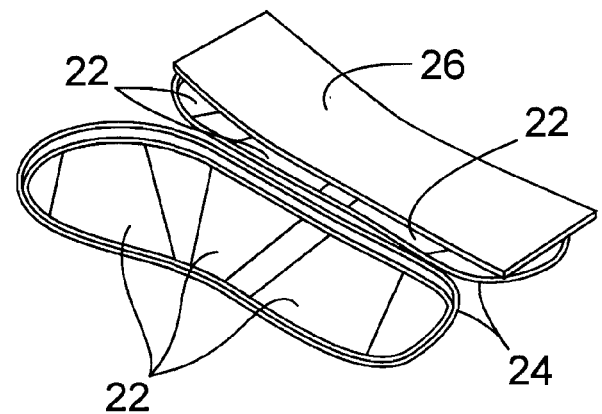
FIG. 5 is a plan view of a piece of rubber in the process of being positioned over the fabric-containing mold of FIG. 4.

After positioning of the fabric segment or segments in the bottom of the mold, rubber 26 may be inserted into the mold (see FIG. 5) on top of the fabric segment or segments in the mold. Then the mold lid is then closed and the mold placed into a vulcanized oven for vulcanization. During the vulcanization process, the rubber 26 is melted by a hot (such as about 150° C.) sulfur stream and shaped to form the resultant outsole with fabric segment or segments. For example, a temperature of from about 100° C. to about 150° C. has been found to be suitable. The rubber 26 thus attached to the coated fabric forms a backing member for the coated fabric.

The mold contents are compressed in the mold heated to a temperature and maintained at that temperature for a time sufficient to vulcanize the rubber by standard methods as discussed above with respect to vulcanization of the rubber in the outsole. Generally, a temperature of at least about 150° C. has been found sufficient.

The mold is then opened, any excess rubber trimmed away and the resultant outsole cooled to form the outsole of the present invention. The outsole 10 of the present invention thus prepared comprises an exposed ground-contacting surface of more than 50%, preferably at least 51%, such as 51% to about 70%, more preferably 51% to about 60%, even more preferably 51% to about 55%, fabric and less than 50%, preferably 49% or less, such as 49% to about 30%, more preferably 49% to about 40%, even more preferably 49% to about 45%, vulcanized rubber. The fabric portion of the exposed surface of the outsole 10 comprises one or more segments of fabric. As a result of the vulcanization of the rubber 26 and cured rubber cement coating 18 that is impregnated into the fabric 16, rubber 26 and cured rubber cement 18 become a single integral mass of rubber with the fabric 16 embedded therein, but still exposed. If the mesh 20 has been applied to the fabric, then the mesh is likewise exposed, with the fabric 16 exposed through the openings in the weave of the mesh.

Figure 6:
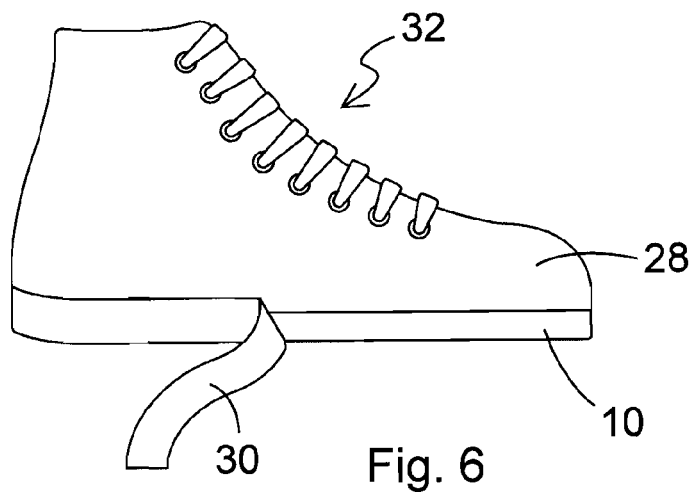
FIG. 6 is an elevation of a shoe of the present invention in the process of being wrapped with rubber foxing.

As shown in FIG. 6, a shoe upper 28 may then be attached to the outsole 10 temporarily with rubber cement, rubber foxing 30 wrapped around the upper 28 and outsole 10 where they meet, held together temporarily with adhesive, and the entire shoe subjected to vulcanization whereby the rubber layer on the bottom of the upper, the rubber on the top of the outsole and the foxing are all vulcanized, molding them together, such that the rubber from the bottom of the upper impregnates the rubber on the top of the outsole and vice versa, resulting in a single, unitary and integral rubber component and the rubber is held to the outsole by the vulcanization, as a result of which the rubber adheres directly to the fabric of the upper. Accordingly, a shoe 32 of the present invention bearing an outsole 10 of the present invention is manufactured.

All references, including without limitation all papers, publications, presentations, texts, reports, manuscripts, brochures, internet postings, journal articles, periodicals, and the like, cited in this specification are hereby incorporated by reference. The discussion of the references herein is intended merely to summarize the assertions made by their authors and no admission is made that any reference constitutes prior art. The inventors reserve the right to challenge the accuracy and pertinence of the cited references.

It is intended that all patentable subject matter disclosed herein be claimed and that no such patentable subject matter be dedicated to the public. Thus, it is intended that the claims be read broadly in light of that intent. In addition, unless it is otherwise clear to the contrary from the context, it is intended that all references to "a" and "an" and subsequent corresponding references to "the" referring back to the antecedent basis denoted by "a" or "an" are to be read broadly in the sense of "at least one." Similarly, unless it is otherwise clear to the contrary from the context, the word "or," when used with respect to alternative named elements is intended to be read broadly to mean, in the alternative, any one of the named elements, any subset of the named elements or all of the named elements.

In view of the above, it will be seen that the several advantages of the invention are achieved and other advantageous results obtained. It should be understood that the aforementioned embodiments are for exemplary purposes only and are merely illustrative of the many possible specific embodiments that can represent applications of the principles of the invention. Thus, as various changes could be made in the above methods and compositions without departing from the scope of the invention, it is intended that all matter contained in the above description as shown in the accompanying drawings shall be interpreted as illustrative and not in a limiting sense.

Moreover, one of ordinary skill in the art can make various changes and modifications to the invention to adapt it to various usages and conditions, including those not specifically laid out herein, without departing from the spirit and scope of this invention. Accordingly, those changes and modifications are properly, equitably, and intended to be, within the full range of equivalents of the invention disclosed and described herein.

What is claimed is:

1. A method for making a shoe, comprising:
   (a) forming a shoe outsole, comprising acquiring a segment of fabric bearing a coating of cured rubber cement, placing rubber against the coating of cured rubber cement, heating the rubber to a temperature below the melting points of the cured rubber cement and the thermoplastic rubber, but high enough to render the cured rubber cement and the thermoplastic rubber tackily adherent to each other and vulcanizing the rubber, thereby to adhere the segment of fabric to the rubber, and cooling the vulcanized rubber to form an outsole having an exposed ground-contacting surface that includes the segment of fabric, and (b) attaching a shoe upper the outsole.

2. A method as set forth in claim 1 wherein the shoe upper is attached to the outsole by first attaching it temporarily with rubber cement, wrapping rubber foxing around the upper and the outsole where they meet to form a wrapped upper and outsole combination, and subjecting the combination to vulcanization whereby a rubber layer on the bottom of the upper, the rubber of the outsole and the foxing are all vulcanized, thereby molding them together such that the rubber from the bottom of the upper impregnates the rubber of the outsole and vice versa to form a shoe.

3. A method as set forth in claim 2, further comprising preparing the segment of fabric coated with cured rubber cement by coating a sheet of fabric with rubber cement, allowing the rubber cement to cure to form a coated fabric sheet, and cutting the coated fabric sheet to form the segment of fabric.

4. A method as set forth in claim 3 wherein the rubber cement comprises natural rubber.

5. A method of making a shoe comprising:
coating a side of a sheet of fabric with rubber cement;
allowing the rubber cement to cure and form a coated fabric sheet;
positioning the coated fabric sheet inside a mold with the rubber cement coated side up;
inserting rubber into the mold on top of the coated fabric sheet inside the mold;
vulcanizing the rubber and the coated fabric sheet inside the mold and forming a resultant outsole;
cooling in the outsole and removing the outsole from the mold; and,
attaching a shoe upper to the outsole.

6. The method of claim 5, further comprising:
sizing and shaping the sheet of fabric for positioning inside the mold prior to coating the side of the sheet of fabric with rubber cement.

7. The method of claim 5, further comprising:
sizing and shaping the sheet of fabric for positioning inside the mold after coating the side of the sheet of fabric with rubber cement and after allowing the rubber cement to cure.

8. The method claim 5, further comprising:
the sheet of fabric being one of a plurality of sheets of fabric;
coating sides of the plurality of sheets of fabric with rubber cement;
allowing the rubber cement to cure and forming a plurality of coated fabric sheets;
positioning the plurality of coated fabric sheets inside the mold with the rubber cement coated sides up;
inserting rubber into the mold on top of the plurality of coated fabric sheets; and,
vulcanizing the rubber and the plurality of coated fabric sheets inside the mold to form the outsole.

9. The method claim 5, further comprising:
adhering a mesh sheet onto a side of the coated fabric sheet opposite the rubber cement coated side such that the fabric sheet is sandwiched between the rubber cement and the mesh.

10. The method of claim 5, further comprising:
allowing the rubber cement to continue to cure after positioning the coated fabric sheet inside the mold.

11. The method of claim 5, further comprising:
the outsole comprising an exposed ground-contacting surface of more than 50% fabric and less than 50% vulcanized rubber.

12. The method of claim 5, further comprising:
the outsole comprising an exposed ground-contacting surface of 51% to 55% fabric and 49% to 45% vulcanized rubber, respectively.

13. A method of making a shoe comprising:
providing a sheet of fabric;
applying a rubber cement to one side of the sheet of fabric that is opposite a fabric side of the sheet fabric;
allowing the rubber cement applied to the one side of the sheet of fabric to seep into the one side of the sheet of fabric and leave a coating of the rubber cement on the one side of the sheet of fabric that is opposite the fabric side of the sheet of fabric;
allowing the coating of the rubber cement on the one side of the sheet of fabric to cure and form a coated fabric sheet with a cured rubber cement coating on the one side of the coated fabric sheet;
positioning the coated fabric sheet in a mold with the cured rubber cement coating on the one side of the coated fabric sheet exposed in the mold and the opposite fabric side of the coated fabric sheet lying against a bottom surface of the mold;
inserting rubber into the mold on top of the cured rubber cement coating on one side of the coated fabric sheet;
vulcanizing the rubber and the coated fabric sheet inside the mold and forming a shoe outsole;
cooling the shoe outsole and removing the shoe outsole from the mold with the outsole comprising an exposed ground-contacting surface of fabric and vulcanized rubber; and,
attaching a shoe upper to the outsole.

14. The method of claim 13, further comprising:
sizing and shaping the sheet of fabric for positioning inside the mold prior to applying the rubber cement to the one side of the sheet of fabric.

15. The method of claim 13, further comprising:
sizing and shaping the sheet of fabric for positioning inside the mold after applying the rubber cement to the one side of the sheet of fabric and after allowing the rubber cement to cure.

16. The method claim 13, further comprising:
the sheet of fabric being one of a plurality of sheets of fabric;
coating sides of the plurality of sheets of fabric with rubber cement;
allowing the rubber cement to cure and forming a plurality of coated fabric sheets;
positioning the plurality of coated fabric sheets inside the mold with the rubber cement coated sides up;
inserting rubber into the mold on top of the plurality of coated fabric sheets; and,
vulcanizing the rubber and the plurality of coated fabric sheets inside the mold to form the outsole.

17. The method claim 13, further comprising:
adhering a mesh sheet onto the fabric side of the sheet of fabric such that the sheet of fabric is sandwiched between the rubber cement and the mesh.

18. The method of claim 13, further comprising:
allowing the rubber cement to continue to cure after positioning the coated fabric sheet inside the mold.

19. The method of claim 13, further comprising:
the outsole comprising an exposed ground-contacting surface of more than 50% fabric and less than 50% vulcanized rubber.

20. The method of claim 13, further comprising:
the outsole comprising an exposed ground-contacting surface of 51% to 55% fabric and 49% to 45% vulcanized rubber, respectively.

* * * * *